(12) United States Patent
Frenkel (10) Patent No.: US 7,324,898 B2
(45) Date of Patent: Jan. 29, 2008

(54) SYSTEM AND METHOD FOR DETERMINING A MORE ACCURATE RESISTIVITY MODEL OF A GEOLOGICAL FORMATION USING TIME-LAPSE WELL LOGGING DATA

(75) Inventor: Michael Frenkel, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 172 days.

(21) Appl. No.: 11/075,471

(22) Filed: Mar. 9, 2005

(65) Prior Publication Data

US 2006/0217888 A1    Sep. 28, 2006

(51) Int. Cl.
G01V 5/04 (2006.01)
G06F 7/48 (2006.01)

(52) U.S. Cl. .............................. 702/7; 703/10
(58) Field of Classification Search ............. 702/1–10; 703/5, 10

See application file for complete search history.

(56) References Cited

U.S. PATENT DOCUMENTS

| RE33,458 | E | 11/1990 | Stolarczyk | 324/334 |
|---|---|---|---|---|
| 5,889,729 | A | 3/1999 | Frenkel et al. | 367/73 |
| 6,591,195 | B2 | 7/2003 | Haugland | 702/7 |
| 6,611,762 | B1 | 8/2003 | Gao | 702/7 |
| 6,671,623 | B1 | 12/2003 | Li | 702/7 |
| 6,832,159 | B2 | 12/2004 | Smits et al. | 702/11 |
| 6,925,384 | B2* | 8/2005 | Frenkel et al. | 702/7 |
| 7,091,877 | B2* | 8/2006 | Barber et al. | 340/853.1 |
| 2002/0040274 | A1 | 4/2002 | Yin | 702/7 |
| 2003/0055566 | A1 | 3/2003 | Kriegshauser | 702/7 |
| 2003/0093223 | A1 | 5/2003 | Zhang | 702/7 |
| 2005/0083061 | A1 | 4/2005 | Tabanou | 324/334 |
| 2006/0217888 | A1* | 9/2006 | Frenkel | 702/7 |
| 2006/0235619 | A1 | 10/2006 | Yang et al. | 702/10 |

OTHER PUBLICATIONS

Aria Abubakar et al., A Three Dimensional Parametric Inversion of Multi-Component Multi-Spacing Induction Logging Data, SEG Int'l Exposition and 74th Annual Meein, Denver, CO,Oct. 10, 2004.
Michael A. Frenkel, Well-site Resistivity Anisotropy Interpretation: A 2-D Method and a Case Study from the Gulf of Mexico, Society of Protroleum Engineers SPE 77793, Sep. 2, 2002.

(Continued)

Primary Examiner—Bryan Bui
Assistant Examiner—Victor J. Taylor
(74) Attorney, Agent, or Firm—Cantor Colburn LLP (57) ABSTRACT

A system and a method for estimating a model of a geological formation are provided. The geological formation has a wellbore extending therethrough. The method includes obtaining a first resistivity log associated with the geological formation from a LWD sensor in the wellbore. The method further includes obtaining a second resistivity log associated with the geological formation from a WL sensor in the wellbore. The method further includes calculating a plurality of horizontal resistivity values associated with the geological formation by utilizing a first inversion technique and the first resistivity log. The method further includes obtaining a plurality of invaded zone resistivity values obtained from a micro-resistivity measurement device in the WL sensor. The method further includes calculating a plurality of invaded zone thickness values proximate the wellbore by utilizing a second inversion technique and the second resistivity log.

24 Claims, 8 Drawing Sheets

OTHER PUBLICATIONS

M. Frenkel et al, Rapid Well-Site 2-D Inversion of Full-Spectrum Array Induction Data, Society of Petroleum Engineers SPE 36505, Oct. 6, 1996.

R. Chunduru et al., Joint Inversion of MWD and Wireline Resistivity Measurements, Society of Petroleum Engineers SPE 59004, Feb. 1, 2000.

L. A. Tabarovsky, Measuring Formation Anisotropy Using Multifrequency Processing of Transverse Induction Measurements, Society of Petroleum Engineers SPE 71706, Sep. 30, 2001.

M. Frenkel, Multiscale Formation Resistivity Imaging, Society of Petroleum Engineers SPE 90935, Nov. 8, 2004.

G. Page, Improved Rt and Sw Definition from the Integration of Wireline and LWD Resistivities, to Reduce Uncertainty, Increase Pay and Aid Reservoir Navigation, Society of Petroleum Engineers SPE 78341, Oct. 31, 2002.

Tom Barber et al., Determining Formation Resistivity Anisotropy in the Presence of Invasion, Society of Petroleum Engineers SPE 90526, Sep. 26, 2004.

* cited by examiner

SYSTEM AND METHOD FOR DETERMINING A MORE ACCURATE RESISTIVITY MODEL OF A GEOLOGICAL FORMATION USING TIME-LAPSE WELL LOGGING DATA

BACKGROUND OF THE INVENTION

Petroleum engineers generally estimate an amount of hydrocarbons stored in a geological formation based on well logging data, including resistivity measurements, from the formation. Logging-while-drilling ("LWD") sensors provide resistivity measurements of a geological formation as a wellbore is being drilled through the geological formation. Wireline ("WL") sensors provide resistivity measurements of the geological formation after the wellbore has been drilled through the geological formation. For the purposes of this application, a wireline or WL sensor should be understood to include any sensor deployed in a pre-drilled borehole, such as those deployed on slick lines or coiled tubing. After the wellbore has been drilled, mud and other material can penetrate into the geological formation adjacent the wellbore, which is called an "invaded" zone. The invaded zone can distort resistivity measurements associated with the geological formation.

Because the WL resistivity measurements are strongly affected by several environmental effects, such as borehole rugosity, invasion, and shoulder-bed effects from adjacent layers, special modeling and inversion based interpretation techniques have been utilized to extract information about the formation properties from the WL resistivity measurements. Similarly, because the LWD resistivity measurements are also strongly affected by the foregoing environmental effects, special modeling and inversion based interpretation techniques have been utilized to extract information about the formation properties from the LWD resistivity measurements.

A problem associated with the current interpretation techniques, however, is that the techniques generate a model of a geological formation that may represent an equivalent solution of an inverse problem and therefore does not accurately represent an actual resistivity model of the geological formation.

Accordingly, there is a need for an improved system and method for determining a more accurate model of a geological formation using well logging data from both a LWD sensor and a WL sensor.

BRIEF DESCRIPTION OF THE INVENTION

A method for estimating a model of a geological formation in accordance with an exemplary embodiment is provided. The geological formation has a wellbore drilled therethrough. The method includes obtaining a first resistivity log associated with the geological formation from a LWD sensor or a similar immediate sensor in the wellbore. The first resistivity log comprises a plurality of resistivity measurements. The method further includes obtaining a second resistivity log associated with the geological formation from a WL or later-run sensor in the wellbore. The second resistivity log comprises a plurality of resistivity measurements. The method further includes calculating a plurality of horizontal resistivity values associated with the geological formation by utilizing a first inversion technique and the first resistivity log. The method further includes obtaining a plurality of invaded zone resistivity values obtained from a micro-resistivity measurement device in the WL sensor. The method further includes calculating a plurality of invaded zone thickness values proximate the wellbore by utilizing a second inversion technique and the second resistivity log, wherein the plurality of horizontal resistivity values are fixed values and the plurality of invaded zone resistivity values are fixed values, wherein the plurality of invaded zone thickness values, the plurality of invaded zone resistivity values, and the plurality of horizontal resistivity values comprise a first model of the geological formation.

A system for estimating a model of a geological formation in accordance with another exemplary embodiment is provided. The geological formation has a wellbore drilled therethrough. The system includes a database configured to store a first resistivity log associated with the geological formation from a LWD sensor or a similar immediate sensor in the wellbore. The first resistivity log comprises a plurality of resistivity measurements. The database is further configured to store a second resistivity log associated with the geological formation from a WL sensor or later-run sensor in the wellbore. The second resistivity log comprises a plurality of resistivity measurements. The database is further configured to store a plurality of invaded zone resistivity values obtained from a micro-resistivity measurement device in the WL sensor. The system further includes a computer operably coupled, permanently or temporarily, to the database. The computer is configured to calculate a plurality of horizontal resistivity values associated with the geological formation by utilizing a first inversion technique and the first resistivity log. The computer is further configured to calculate a plurality of invaded zone thickness values proximate the wellbore by utilizing a second inversion technique and the second resistivity log, wherein the plurality of horizontal resistivity values are fixed values and the plurality of invaded zone resistivity values are fixed values, wherein the plurality of invaded zone thickness values, the plurality of invaded zone resistivity values, and the plurality of horizontal resistivity values comprise a first model of the geological formation.

A method for estimating a model of a geological formation in accordance with another exemplary embodiment is provided. The geological formation has a wellbore drilled therethrough. The method includes obtaining a first resistivity log associated with the geological formation from a LWD sensor or a similar immediate sensor in the wellbore. The first resistivity log comprises a plurality of resistivity measurements. The method further includes obtaining a second resistivity log associated with the geological formation from a WL sensor or later-run sensor in the wellbore. The second resistivity log comprises a plurality of resistivity measurements. The method further includes calculating a plurality of horizontal resistivity values associated with the geological formation by utilizing a first inversion technique and the first resistivity log. The method further includes calculating a plurality of invaded zone resistivity values and a plurality of invaded zone thickness values proximate the wellbore by utilizing a second inversion technique and the second resistivity log, wherein the plurality of horizontal resistivity values are fixed values, wherein the plurality of invaded zone thickness values, the plurality of invaded zone resistivity values, and the plurality of horizontal resistivity values comprise a first model of the geological formation.

A system for estimating a model of a geological formation in accordance with another exemplary embodiment is provided. The geological formation has a wellbore drilled therethrough. The system includes a database configured to store a first resistivity log associated with the geological formation from a LWD sensor or a similar immediate sensor in the wellbore. The first resistivity log comprises a plurality of resistivity measurements. The database is further configured to store a second resistivity log associated with the geological formation from a WL sensor or later sensor in the wellbore. The second resistivity log comprises a plurality of resistivity measurements. The system further includes a computer operably coupled, temporarily or permanently, to the database. The computer is configured to calculate a plurality of horizontal resistivity values associated with the geological formation by utilizing a first inversion technique and the first resistivity log. The computer is further configured to calculate a plurality of invaded zone resistivity values and a plurality of invaded zone thickness values proximate the wellbore by utilizing a second inversion technique and the second resistivity log, wherein the plurality of horizontal resistivity values are fixed values, wherein the plurality of invaded zone thickness values, the plurality of invaded zone resistivity values, and the plurality of horizontal resistivity values comprise a first model of the geological formation.

Other systems and/or methods of the invention according to the embodiments will become or are apparent to one with skill in the art upon review of the following drawings and detailed description.

DETAILED DESCRIPTION OF THE INVENTION

Figure 1:
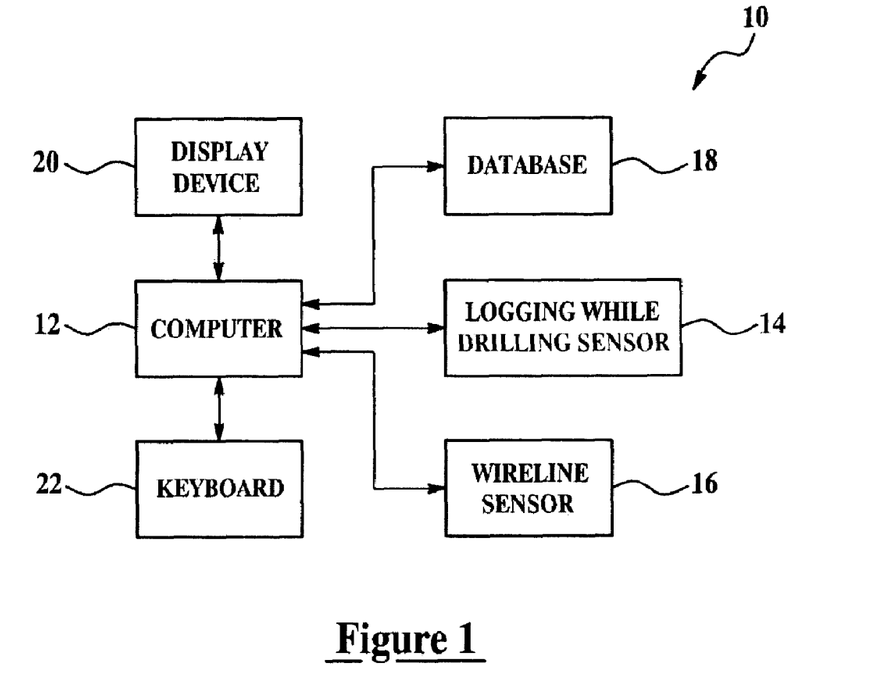
FIG. 1 is a block diagram of a system for estimating a model of the geological formation in accordance with an exemplary embodiment.

Referring to FIG. 1, a system 10 for determining a mathematical model of the geological formation is illustrated. The system 10 includes a computer 12, an LWD sensor 14, a WL sensor 16, a database 18, a display device 20, and a keyboard 22.

It will be appreciated by those skilled in the art that, although a computer 12 is referenced and depicted as a single unit, that several processors, within the same unit or residing distances apart, could work collaboratively as a computer and are considered a "computer" for purposes of this application. Similarly, a "computer" may comprise a processor only or be a unit hardwired into any unit that fulfills another function.

Similarly, it will be appreciated that, although LWD sensors describe a certain set of sensors in the art, in this application the term is used in its broadest sense to describe a sensor which takes a reading or measurement immediately or soon after drilling a wellbore. An LWD sensor would not, therefore, need to be a part of a bottom hole assembly (BHA) or adjacent to a drill bit. Indeed, a traditional wireline sensor could be used as the LWD sensor if it could be run through the wellbore quickly enough after drilling the wellbore.

It will be also appreciated that, although a WL sensor describes a certain set of sensors in the art, the definitions previously set out for that term apply within this application. The exact method of running the WL sensor is not definitive of a WL sensor; rather, the fact that the sensor is run later, after the borehole has been drilled, is of definitional importance to the WL sensor as that term is used in this application.

Figure 2:
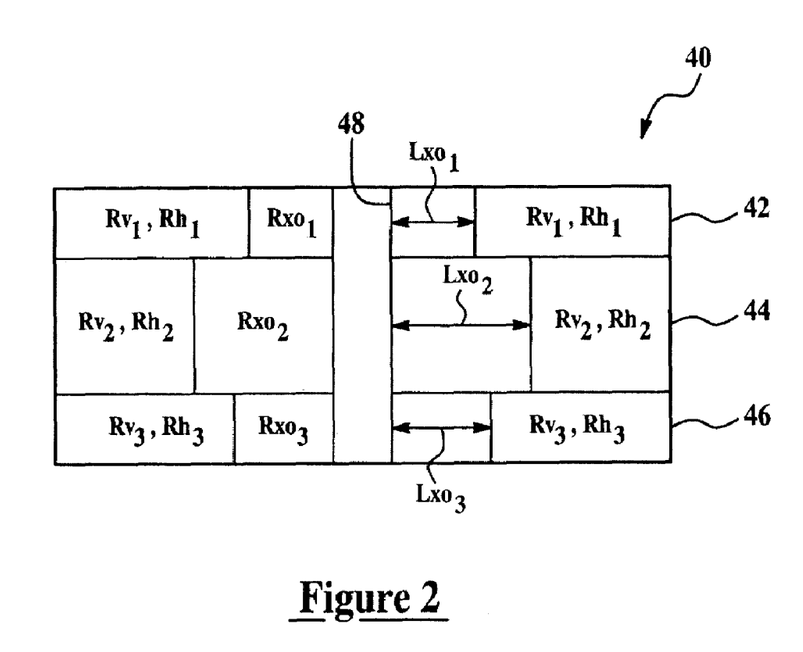
FIG. 2 is a schematic of an exemplary geological formation.

Referring to FIG. 2, before explaining the system 10 in greater detail, a brief explanation of a geological formation will now be described. The geological formation 40 includes layers 42, 44, 46. Of course, the geological formation 40 can include a plurality of additional layers that are not shown. When drilling the wellbore 48 through the geological formation 40, a region surrounding the wellbore 48 called an "invaded region" is partially filled with drilling mud and other material. Further, the invaded region has resistivity characteristics different than a portion of a layer outside of the invaded region. A mathematical model or Earth model of the geological formation 40 includes a plurality of parameters associated with each layer of the formation 40. The model can comprise either an isotropic model or in anisotropic model. An isotropic model of a geological formation includes the following parameters for each layer: (i) a horizontal resistivity Rh, (ii) an invaded zone resistivity Rxo, and (iii) an invaded zone thickness Lxo. The anisotropic model of a geological formation comprises the foregoing parameters and further includes the vertical resistivity value Rv. The invaded zone resistivity Rxo corresponds to a resistivity of the invaded region of a layer of the geological formation 40. The invaded zone thickness value Lxo corresponds to a thickness of the invaded region outwardly from the wellbore 48. The horizontal resistivity value Rh corresponds to a resistivity of a portion of the layer that extends outwardly from the invaded region. The vertical resistivity value Rv corresponds to a vertical resistivity of a portion of the layer that extends outwardly from the invaded region. The term "resistivity" can be represented by ohms per meter or by any other number of convenient units of measure.

For purposes of discussion, when a plurality of model parameters are being discussed, the subscript "i" will be utilized. For example, a plurality of horizontal resistivity values is represented by $Rh_i$, a plurality of invaded zone resistivity values is represented by $Rxo_i$, and a plurality of invaded zone thickness values is represented by $Lxo_i$, and a plurality of vertical resistivity values is represented by $Rv_i$.

Referring to FIG. 1, the various components of system 10 will now be explained. The computer 10 is provided to obtain resistivity values from the LWD sensor 14, and the WL sensor 16 and to generate first and second resistivity logs, respectively, which are a stored in the database 18. The computer 10 is further provided to determine a model of the geological formation 40. In particular, computer 10 can calculate parameters representing an isotropic model or an anisotropic model of the geological formation 40. The computer 10 is operably coupled to the LWD sensor 14, the WL sensor 16, the database 18, the display device 20, and the keyboard 22. The coupling may be permanent or temporary, including wired, wireless or media couplings. "Coupling" is intended to encompass any means of data communication between the units.

The LWD sensor 14 is provided to generate one or more resistivity logs associated with the geological formation 40 when the wellbore 48 is being drilled through the geological formation 40 by a drilling rig (not shown). Each resistivity log comprises a plurality of resistivity measurements. The LWD sensor 14 comprises an induction sensor, known to those skilled in the art, which generates signals indicating apparent resistivity values of the geological formation 40.

The WL sensor 16 is provided to generate one or more resistivity logs associated with the geological formation 40 after the wellbore 48 has been formed by a drilling rig (not shown). Each resistivity log comprises a plurality of resistivity measurements. The LWD sensor 14 comprises an induction sensor, known to those skilled in the art, which generates signals indicating apparent resistivity values of the geological formation 40. In an alternate embodiment, the LWD sensor 14 comprises a galvanic sensor known to those skilled in the art. The WL sensor 16 is further configured to provide microresistivity measurements utilizing x-axis, y-axis, and z-axis coils therein. Other embodiments may use different manners of resistivity sensors.

The database 18 is provided to store the one or more resistivity logs associated with the LWD sensor 14 and one or more resistivity logs associated with the WL sensor 16. The database 18 is configured to communicate with the computer 12. It will be appreciated by those skilled in the art that "database" as it is used in this application is used in its broadest sense and may comprise one or more individual databases and may include database systems that store data in disparate locations.

The keyboard 22 is provided to allow a user to input information for inducing the computer 12 to determine a model of the geological formation 40. The keyboard 22 is operably coupled to the computer 12.

The display device 20 is provided to display parameters associated with a model of the geological formation 40. The display device 20 is operably coupled to the computer 12.

Referring to FIGS. 3-7, a method for estimating a model of a geological formation 41 in accordance with an exemplary embodiment will now be described. The method may be, in one embodiment, implemented utilizing a software program executed in the computer 12.

Figure 3:
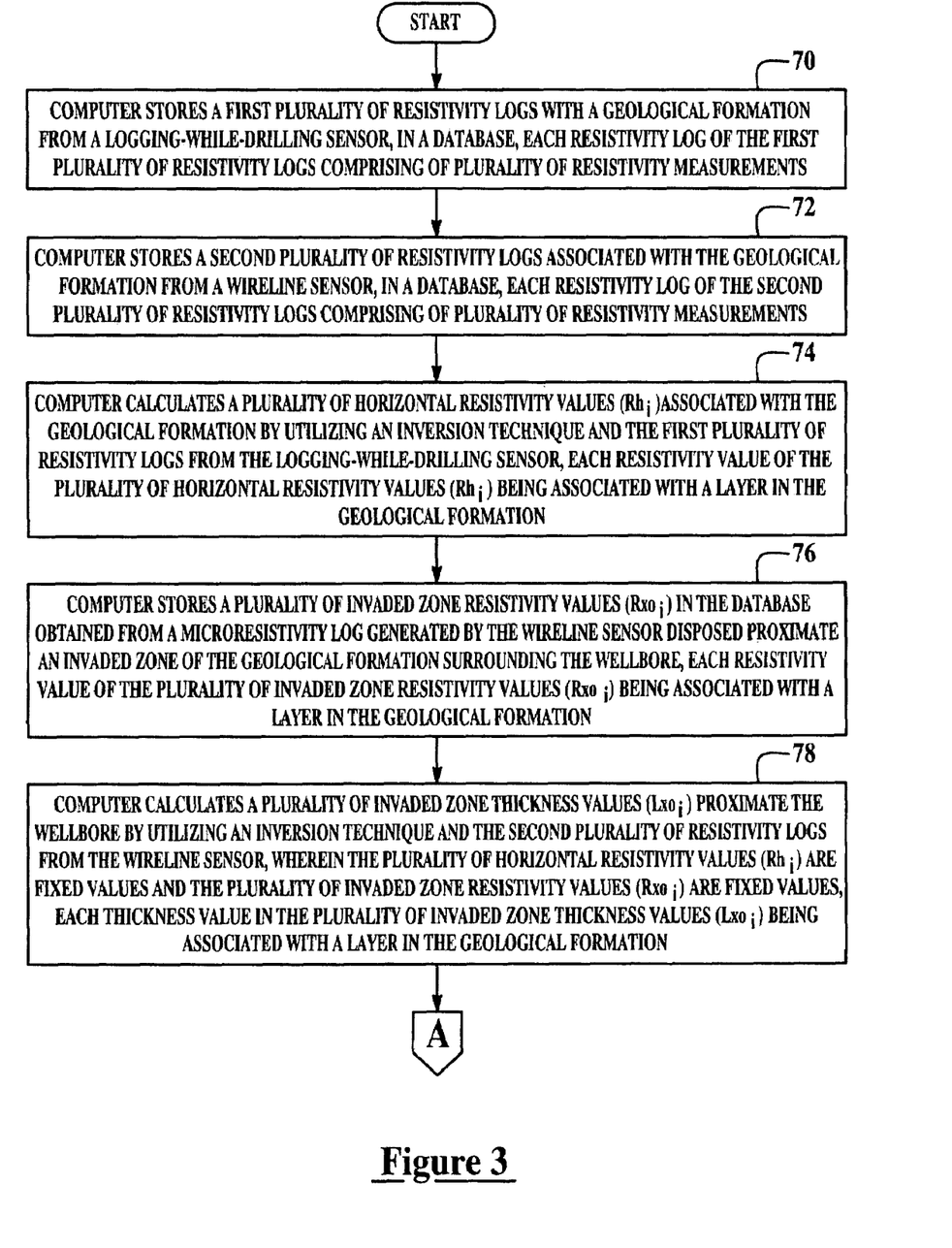
FIGS. 3-7 are flowcharts of a method for estimating a model of a geological formation in accordance with another exemplary embodiment.

At step 70, the computer 12 stores a first plurality of resistivity logs associated with a geological formation 40 from a LWD sensor 14, in the database 18. Each resistivity log of the first plurality of resistivity logs comprises a plurality of resistivity measurements. Of course, alternately, the computer 12 could store only one resistivity log from the LWD sensor 14 if desired, instead of the first plurality of resistivity logs.

At step 72, the computer 12 stores a second plurality of resistivity logs associated with the geological formation 40 from the WL sensor 16, in the database 18. Each resistivity log of the second plurality of resistivity logs comprises a plurality of resistivity measurements. Of course, alternately, the computer 12 could store only one resistivity log from the WL sensor 16 if desired, instead of the second plurality of resistivity logs.

At step 74, the computer 12 calculates a plurality of horizontal resistivity values ($Rh_i$) associated with the geological formation 40 by utilizing an inversion technique and the first plurality of resistivity logs from the LWD sensor 14. Each resistivity value of the plurality of horizontal resistivity values ($Rh_i$) is associated with a layer in the geological formation 40. The inversion technique utilized in step 74, and in other steps described herein, comprise a least-squares inversion technique (based on a local linearization of a non-linear inverse problem). The least squares inversion technique utilizes forward modeling during each iteration of the inversion technique in order to calculate a Jacobian matrix. For example, one or more of the inversion techniques described in commonly owned U.S. Pat. No. 5,889,729, which is hereby incorporated by reference in this entirety, can be utilized for each inversion technique discussed herein. Of course, any other inversion technique known to those skilled in the art can be utilized for each step utilizing an inversion technique discussed herein.

Figure 5:
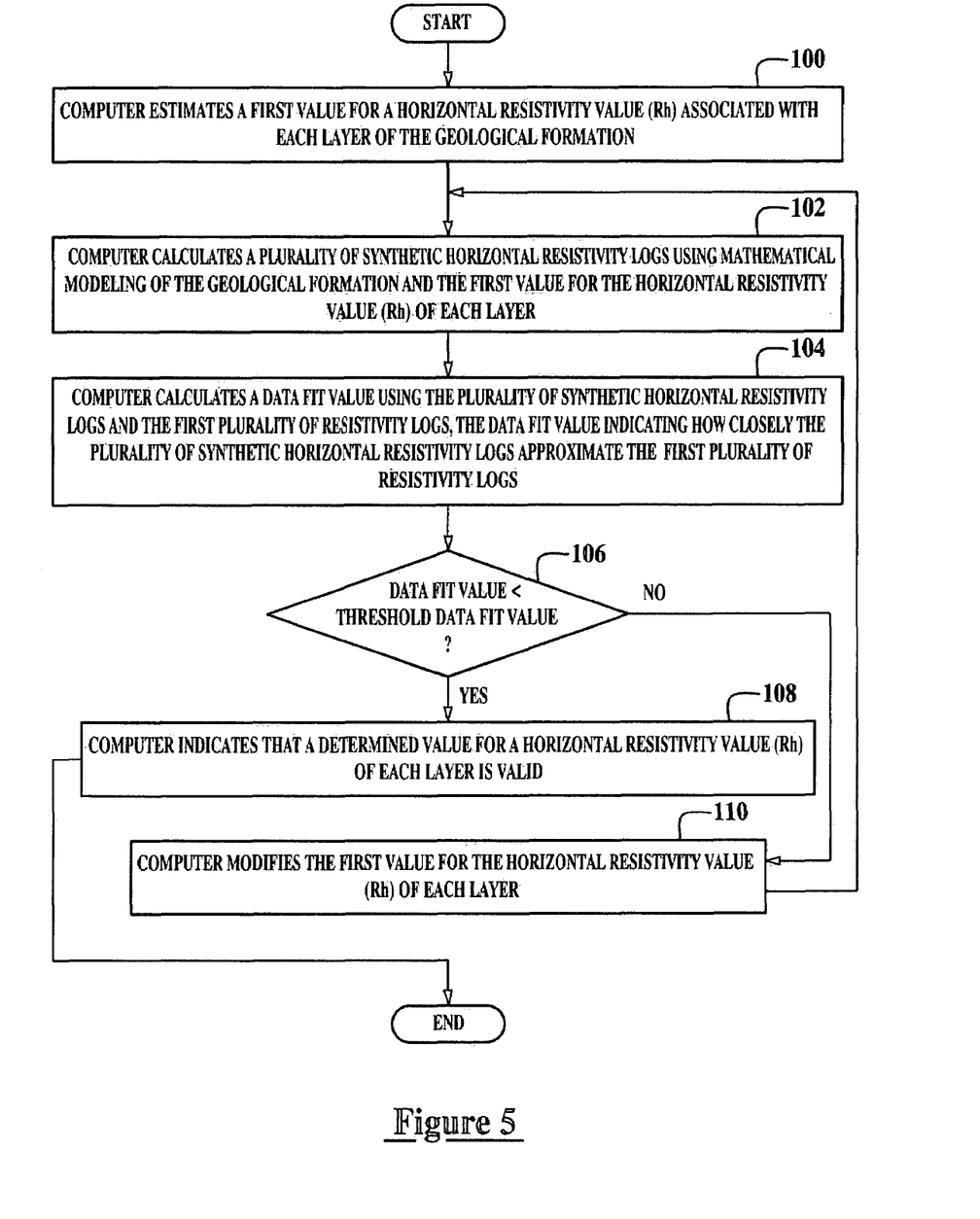

Referring to FIG. 5, the step 74 is implemented utilizing the steps 100-110. At step 100, the computer 12 estimates a first value for a horizontal resistivity value (Rh) associated with each layer of the geological formation 40.

At step 102, the computer 12 calculates a plurality of synthetic or estimated horizontal resistivity logs using mathematical modeling of the geological formation 40 and the first value for the horizontal resistivity value (Rh) of each layer.

At step 104, the computer 12 calculates a data fit value using the plurality of synthetic horizontal resistivity logs and the first plurality of resistivity logs. The data fit value indicates how closely the plurality of synthetic horizontal resistivity logs approximate the first plurality of resistivity logs, and thus the accuracy of the mathematical model of the geological formation 40.

At step 106, the computer 12 makes a determination as to whether the data fit value is less than a threshold data fit value. If the value of step 106 equals "yes", the method advances to step 108. Otherwise, the method advances to step 110.

At step 108, the computer 12 indicates that a determined value for the horizontal resistivity value (Rh) of each layer is valid. After step 108, the method advances to step 76.

At step 110, the computer 12 modifies the first value for the horizontal resistivity value (Rh) of each layer. After the step 110, the method advances to step 102.

Referring to FIG. 3, after step 74 is completed, the method advances to step 76. At step 76, the computer 12 stores a plurality of invaded zone resistivity values ($Rxo_i$) in the database 18, obtained from a microresistivity log. The microresistivity log is generated by the WL sensor 16 disposed proximate an invaded zone of the geological formation 40 surrounding the wellbore 48. Each resistivity value of the plurality of invaded zone resistivity values ($Rxo_i$) is associated with a layer in the geological formation 40.

At step 78, the computer 12 calculates a plurality of invaded zone thickness values ($Lxo_i$) proximate the wellbore 48 by utilizing an inversion technique and the second plurality of resistivity logs from the WL sensor 16, wherein the plurality of horizontal resistivity values ($Rh_i$) are fixed values and the plurality of invaded zone resistivity values ($Rxo_i$) are fixed values. Each thickness value in the plurality of invaded zone thickness values ($Lxo_i$) is associated with a layer in the geological formation 40.

Figure 6:
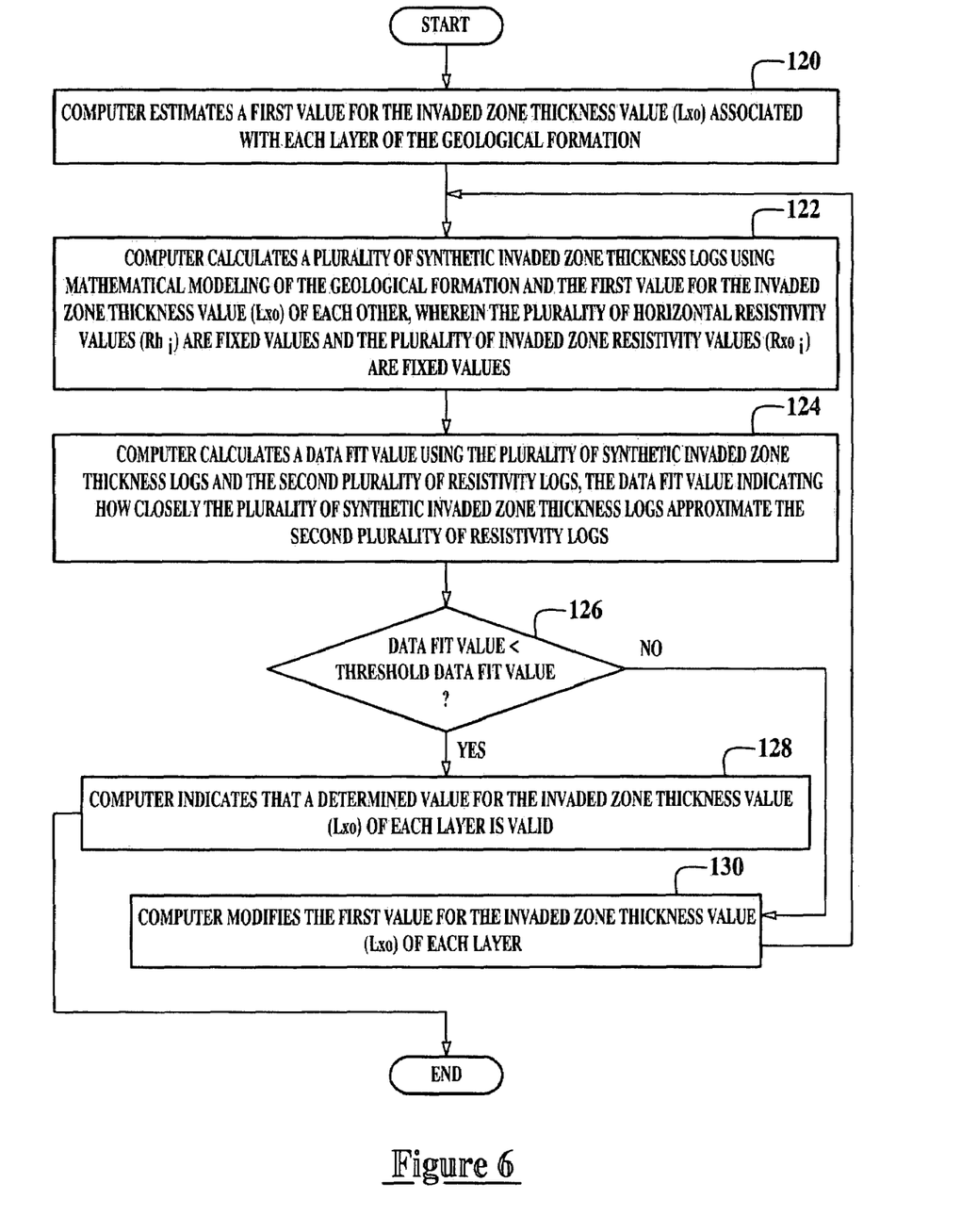

Referring to FIG. 6, the step 78 is implemented utilizing the steps 120-130. At step 120, the computer 12 estimates a first value for the invaded zone thickness value (Lxo) associated with each layer of the geological formation 40.

At step 122, the computer 12 calculates a plurality of synthetic invaded zone thickness logs using mathematical modeling of the geological formation 40 and the first value for the invaded zone thickness value (Lxo) of each layer, wherein the plurality of horizontal resistivity values ($Rh_i$) are fixed values and the plurality of invaded zone resistivity values ($Rxo_i$) are fixed values.

At step 124, the computer 12 calculates a data fit value using the plurality of synthetic invaded zone thickness logs and the second plurality of resistivity logs. The data fit value indicates how closely the plurality of synthetic invaded zone thickness logs approximate the second plurality of resistivity logs.

At step 126, the computer 12 makes a determination as to whether the data fit value is less than the threshold data fit value. If the value of step 126 equals "yes", the method advances to step 128. Otherwise, the method advances to step 130.

At step 128, the computer 12 indicates that a determined value for the invaded zone thickness value (Lxo) of each layer is valid. After step 128, the method advances to step 80.

At step 130, the computer 12 modifies the first value for the invaded zone thickness value (Lxo) of each layer. After step 130, the method advances to step 122.

Figure 4:
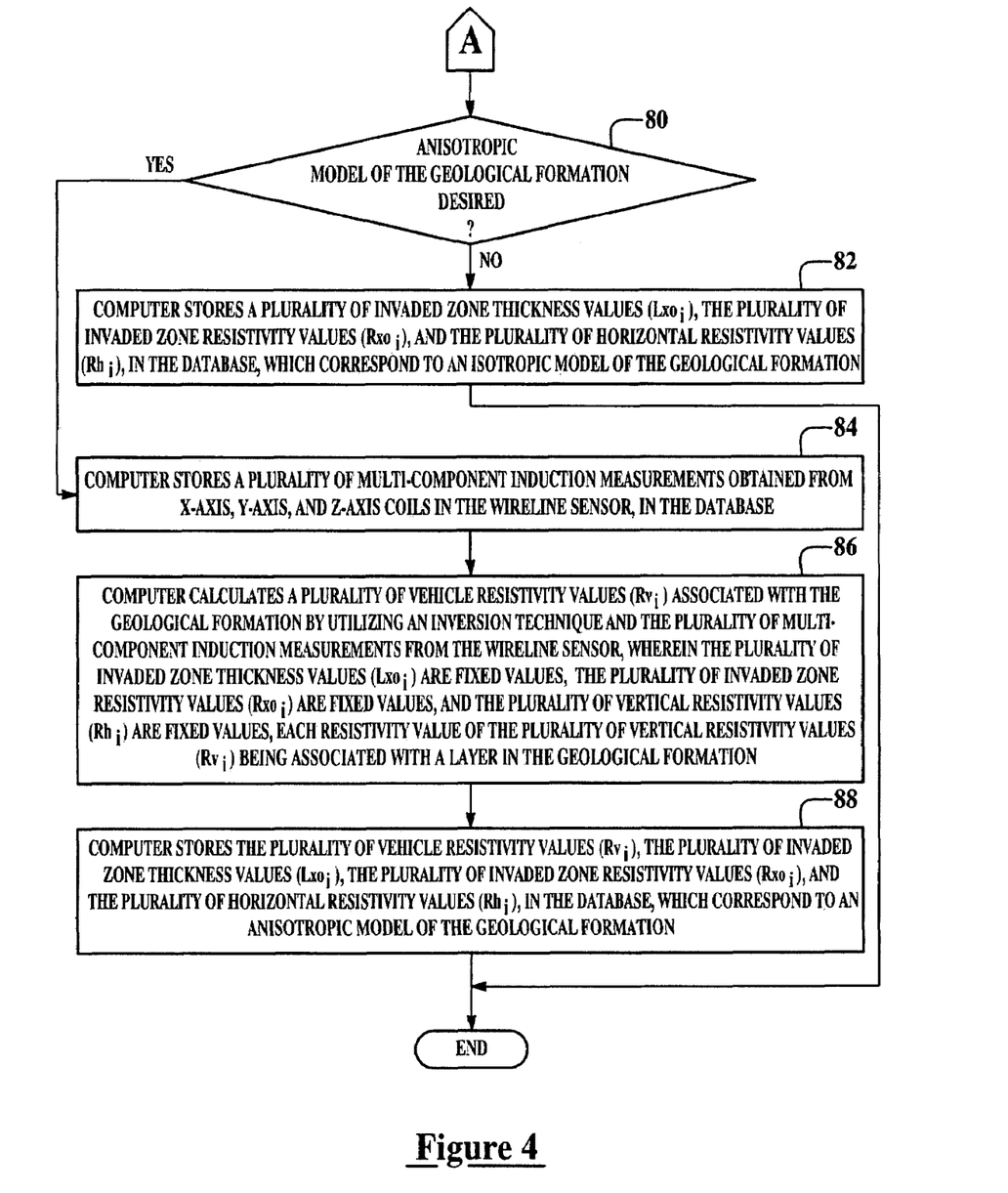

Referring to FIGS. 3 and 4, after step 78 is completed, the method advances to step 80. At step 80, the computer 12 queries an operator as to whether an anisotropic model of the geological formation 40 is desired. If the value of step 80 equals "yes", the method advances to step 84. Otherwise, the method advances to step 82.

At step 82, the computer 12 stores the plurality of invaded zone thickness values ($Lxo_i$), the plurality of invaded zone resistivity values ($Rxo_i$), and the plurality of horizontal resistivity values ($Rh_i$), in the database 18, which correspond to an isotropic model of the geological formation 40. After step 82, the method is exited.

At step 84, the computer 12 stores a plurality of multi-component induction measurements obtained from x-axis, y-axis, and z-axis coils in the WL sensor 16, in the database 18.

At step 86, the computer 12 calculates a plurality of vertical resistivity values ($Rv_i$) associated with the geological formation 40 by utilizing an inversion technique and the plurality of multi-component induction measurements from the WL sensor 16, wherein the plurality of invaded zone thickness values ($Lxo_i$) are fixed values, the plurality of invaded zone resistivity values ($Rxo_i$) are fixed values, and the plurality of horizontal resistivity values ($Rh_i$) are fixed values. Each resistivity value of the plurality of vertical resistivity values ($Rv_i$) is associated with a layer in the geological formation 40.

Figure 7:
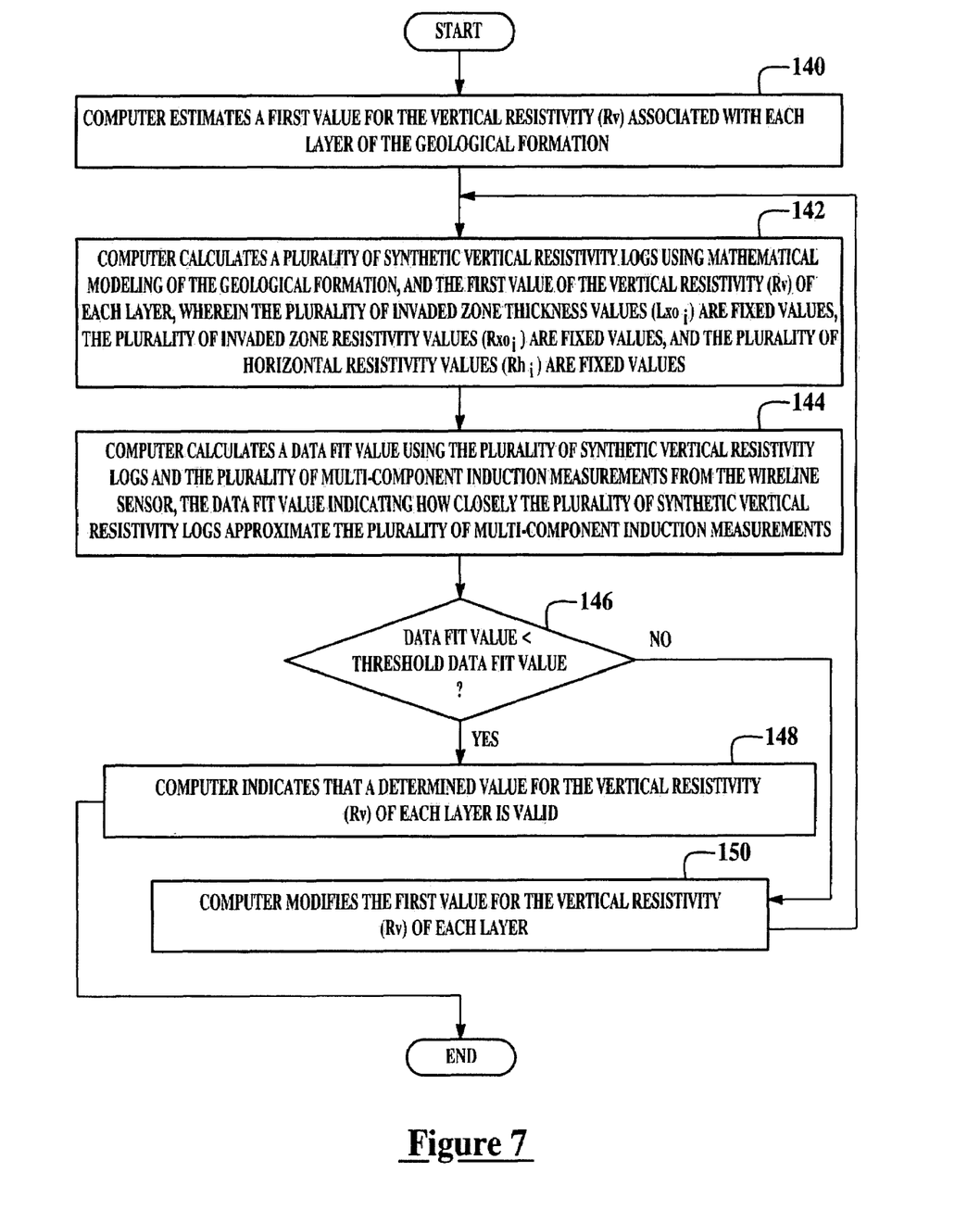

Referring to FIG. 7, the step 86 is implemented utilizing the steps 140-150. At step 140, the computer 12 estimates a first value for the vertical resistivity (Rv) associated with each layer of the geological formation 40.

At step 142, the computer 12 calculates a plurality of synthetic vertical resistivity logs using mathematical modeling of the geological formation 40 and the first value for the vertical resistivity (Rv) of each layer, wherein the plurality of invaded zone thickness values ($Lxo_i$) are fixed values, the plurality of invaded zone resistivity values ($Rxo_i$) are fixed values, and the plurality of horizontal resistivity values ($Rh_i$) are fixed values.

At step 144, the computer 12 calculates a data fit value using the plurality of synthetic vertical resistivity logs and the plurality of multi-component induction measurements from the WL sensor 16. The data fit value indicates how closely the plurality of synthetic vertical resistivity logs approximate the plurality of multi-component induction measurements.

At step 146, the computer 12 makes determination as to whether the data fit value is less than a threshold data fit value. If the value of step 146 equals "yes", the method advances to step 148. Otherwise, the method advances step 150.

At step 148, the computer 12 indicates that a determined value for the vertical resistivity (Rv) of each layer is valid. After step 148, the method advances to step 88.

At step 150, the computer 12 modifies the first value for the vertical resistivity (Rv) of each layer. After step 150, the method advances to step 142.

Referring to FIG. 4, after step 86 is completed, the method advances to step 88. At step 88, the computer 12 stores the plurality of vertical resistivity values ($Rv_i$), the plurality of invaded zone thickness values ($Lxo_i$), the plurality of invaded zone resistivity values ($Rxo_i$), and the plurality of horizontal resistivity values ($Rh_i$), in the database 18, which correspond to an anisotropic model of the geological formation 40. After step 88, the method is exited.

Figure 8:
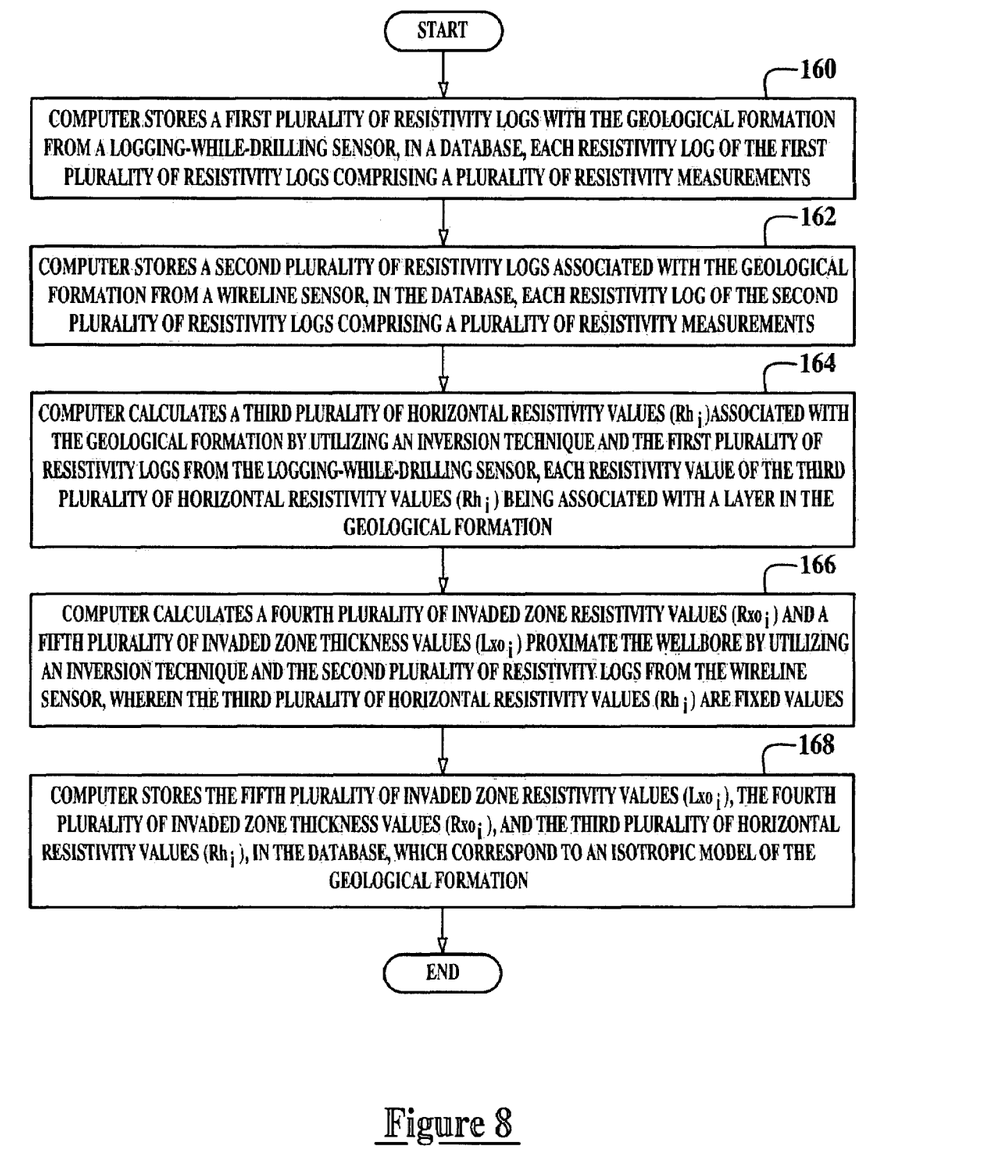
FIGS. 8-9 are flowcharts of a method for estimating a model of a geological formation in accordance with another exemplary embodiment.
Figure 9:
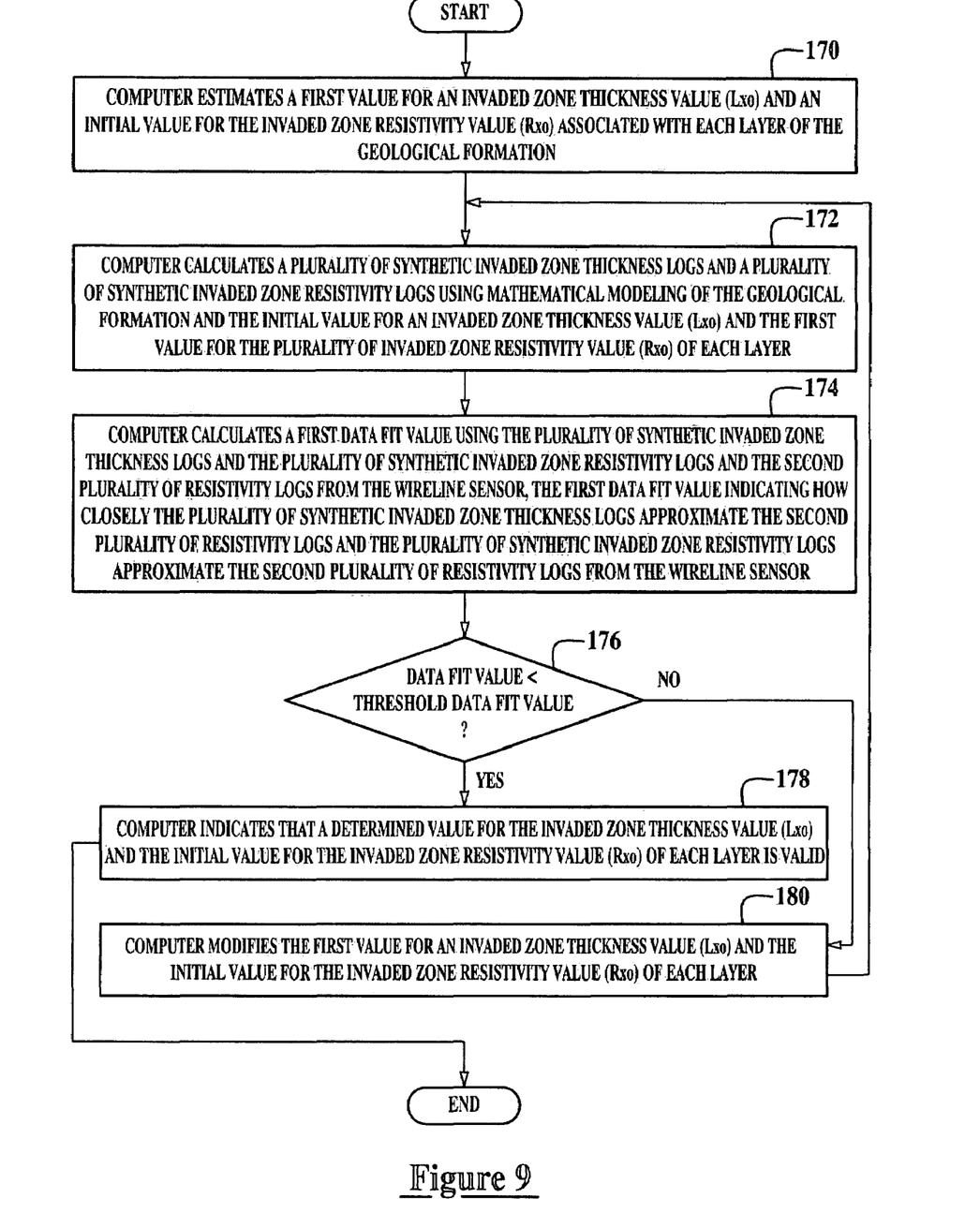

Referring to FIGS. 8-9, a method for estimating a model of a geological formation 40 in accordance with another exemplary embodiment will now be described. The method is implemented utilizing a software program executed in the computer 12.

At step 160, the computer 12 stores a first plurality of resistivity logs associated with the geological formation 40 from the LWD sensor 14, in the database 18. Each resistivity log of the first plurality of resistivity logs comprises a plurality of resistivity measurements. Of course, alternately, the computer 12 could store only one resistivity log from the LWD sensor 14 if desired, instead of the first plurality of resistivity logs.

At step 162, the computer 12 stores a second plurality of resistivity logs associated with the geological formation 40 from the WL sensor 16, in the database 18. Each resistivity log of the second plurality of resistivity logs comprises a plurality of resistivity measurements. Of course, alternately, the computer 12 could store only one resistivity log from the WL sensor 16 if desired, instead of the second plurality of resistivity logs.

At step 164, the computer 12 calculates a third plurality of horizontal resistivity values ($Rh_i$) associated with the geological formation 40 by utilizing an inversion technique and the first plurality of resistivity logs from the LWD sensor 14. Each resistivity value of the third plurality of horizontal resistivity values ($Rh_i$) being associated with a layer in the geological formation 40. The step 164 is implemented utilizing steps similar to those described above with respect to step 74.

At step 166, the computer 12 calculates a fourth plurality of invaded zone resistivity values ($Rxo_i$) and a fifth plurality of invaded zone thickness values ($Lxo_i$) proximate the wellbore 48 by utilizing an inversion technique and the second plurality of resistivity logs from the WL sensor 16, wherein the third plurality of horizontal resistivity values ($Rh_i$) are fixed values.

Referring to FIG. 9, the step 166 is implemented utilizing the steps 170-180. At step 170, computer 12 estimates a first value for an invaded zone thickness value (Lxo) and a second value for the invaded zone resistivity value (Rxo) associated with each layer of the geological formation 40.

At step 172, the computer 12 calculates a plurality of synthetic invaded zone thickness logs and a plurality of synthetic invaded zone resistivity logs using mathematical modeling of the geological formation 40 and the first value for an invaded zone thickness value (Lxo) and the second value for the invaded zone resistivity value (Rxo) of each layer.

At step 174, the computer 12 calculates a first data fit value using the plurality of synthetic invaded zone thickness logs and the plurality of synthetic invaded zone resistivity logs and the second plurality of resistivity logs from the WL sensor 16. The first data fit value indicates how closely (i) the plurality of synthetic invaded zone thickness logs approximate the second plurality of resistivity logs, and (ii) the plurality of synthetic invaded zone resistivity logs approximate the second plurality of resistivity logs from the WL sensor 16.

At step 176, the computer 12 makes a determination as to whether the first data fit value is less than a threshold data fit value. If the value of step 176 equals "yes", the method advances to step 178. Otherwise, the method advances to step 180.

At step 178, the computer 12 indicates that a determined value for the invaded zone thickness value (Lxo) and a determined value for the invaded zone resistivity value (Rxo) of each layer are valid. After step 178, the method advances to step 168.

At step 180, the computer 12 modifies the first value for an invaded zone thickness value (Lxo) and the second value for the invaded zone resistivity value (Rxo) of each layer. After step 180, the method advances to step 172.

Referring to FIG. 8, after step 166 is completed, the method advances to step 168. At step 168, the computer 12 stores the fifth plurality of invaded zone thickness values ($Lxo_i$), the fourth plurality of invaded zone resistivity values ($Rxo_i$), and the third plurality of horizontal resistivity values ($Rh_i$), in the database 18, which correspond to an isotropic model of the geological formation 40. After step 168, the method is exited.

The system and the method for determining a model of a geological formation provide a substantial advantage over other systems and methods. In particular, the system and the method provide a technical effect for determining a unique and more accurate model of a geological formation using logging data from a WL sensor and logging data from a LWD sensor.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and/or executed by a computer, the computer becomes an apparatus for practicing the invention. When implemented on a general-purpose microprocessor, the computer program code segments configure the microprocessor to create specific logic circuits.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

I claim:

1. A method for estimating a model of a formation, the formation having a wellbore extending therethrough, comprising:
    obtaining a first resistivity measurement associated with the formation from a logging-while-drilling (LWD) senor, utilizing a computer;
    obtaining a second resistivity measurement and a third invaded zone resistivity measurement associated with the formation from a second sensor, after obtaining the first resistivity measurement, utilizing the computer;
    calculating an invaded zone thickness value for the wellbore using a first inversion technique, based on the first resistivity measurement, the second resistivity measurement, and the third invaded zone resistivity measurement, utilizing the computer; and
    storing the invaded zone thickness value in a database, utilizing the computer.

2. The method of claim 1, wherein the model comprises an isotropic model of the formation.

3. The method of claim 1, wherein the invaded zone resistivity value is associated with an invaded zone of the formation proximate the wellbore.

4. The method of claim 1, wherein the first inversion technique comprises a least-squares inversion technique.

5. The method of claim 1, wherein the invaded zone resistivity value is associated with a predetermined layer in the formation.

6. The method of claim 5, wherein the invaded zone thickness value is associated with a predetermined layer in the formation.

7. The method of claim 1, wherein the second sensor comprises a wireline (WL) sensor, the method further comprising:
    obtaining multi-component induction measurement obtained from an x-axis coil, a y-axis, and an z-axis coil in the WL sensor, utilizing the computer;
    calculating a vertical resistivity value associated with the formation by utilizing a second inversion technique, based on the multi-component induction measurement from the WL sensor, utilizing the computer; and
    storing the vertical resistivity value in the database, utilizing the computer.

8. The method of claim 1, wherein the second sensor comprises a wireline (WL) sensor, the third invaded zone resistivity measurement being obtained utilizing a micro-resistivity measurement device in the WL sensor.

9. The method of claim 1, further comprising calculating a horizontal resistivity value associated with the formation by utilizing the first inversion technique, based on the first resistivity measurement, utilizing the computer.

10. The method of claim 9, wherein the horizontal resistivity value is associated with a predetermined layer in the formation.

11. The method of claim 10, wherein the invaded zone thickness value, the third invaded zone resistivity measurement, and the horizontal resistivity value comprise a first model of the formation.

12. A system for estimating a model of a formation, the formation having a wellbore extending therethrough, comprising:
    a database configured to store a first resistivity measurement from a logging-while-drilling (LWD) sensor associated with the formation, the database further configured to later store a second resistivity measurement and a third invaded zone resistivity measurement associated with the formation from a second sensor; and a computer operably coupled to the database, the computer configured to calculate an invaded zone thickness value for the wellbore using a first inversion technique, based on the first resistivity measurement, the second resistivity measurement, and the third invaded zone resistivity measurement, the computer being further configured to store the invaded zone thickness value for the wellbore in the database.

13. The system of claim 12, wherein the second sensor comprises a wireless (WL) sensor, the database being further configured to stores at least one multi-component induction measurement obtained from an x-axis coil, a y-axis, and an z-axis coil in the WL sensor, the computer being further configured to calculate a vertical resistivity value associated with the formation by utilizing a second inversion technique, based on the multi-component induction measurement, the computer being further configured to store the vertical resistivity value associated with the formation in the database.

14. A method for estimating a model of a formation, the formation having a wellbore extending therethrough, comprising:

obtaining a first resistivity measurement associated with the formation from a logging-while-drilling (LWD) sensor, utilizing a computer;

obtaining a second resistivity measurement associated with the formation from a second sensor, after obtaining the first resistivity measurement, utilizing the computer;

calculating an invaded zone resistivity value and an invaded zone thickness value for the wellbore by utilizing an inversion technique, based on the second resistivity measurement, utilizing the computer; and storing the invaded zone resistivity value and the invaded zone thickness value for the wellbore in a database, utilizing the computer.

15. The method of claim 14, wherein the model comprises an isotropic model of the formation.

16. The method of claim 15, wherein the inversion technique comprises a least-squares inversion technique.

17. The method of claim 14, wherein the invaded zone resistivity value is associated with an invaded zone of the formation proximate the wellbore.

18. The method of claim 14, wherein the invaded zone resistivity value is associated with a predetermined layer in the formation.

19. The method of claim 18, wherein the invaded zone thickness value is associated with the predetermined layer in the formation.

20. The method of claim 14, further comprising calculating a horizontal resistivity value utilizing the inversion technique, based on the first resistivity measurement, utilizing the computer.

21. The method of claim 20, wherein the horizontal resistivity value is associated with a predetermined layer in the formation.

22. The method of claim 21, wherein the invaded zone thickness value, the invaded zone resistivity value, and the horizontal resistivity value comprise a first model of the formation.

23. A system for estimating a model of a formation, the formation having a wellbore extending therethrough, comprising:

a database configured to store a first resistivity measurement associated with the formation from a logging-while-drilling (LWD) sensor, the database is further configured to later store a second resistivity measurement associated with the formation from a second sensor; and a computer operably coupled to the database, the computer configured to calculate an invaded zone resistivity value and an invaded zone thickness value for the wellbore by utilizing an inversion technique, based on the second resistivity measurement, the computer being further configured to store the invaded zone resistivity value and the invaded zone thickness value for the wellbore in the database.

24. The system of claim 23, wherein the model comprises an isotropic model of the formation.

* * * * *